United States Patent
Murakami (10) Patent No.: US 8,195,183 B2
(45) Date of Patent: Jun. 5, 2012

(54) CALL ADMISSION PRIORITY CONTROL DETERMINATION DEVICE AND MOBILE WIRELESS COMMUNICATION SYSTEM

(75) Inventor: Masaru Murakami, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 115 days.

(21) Appl. No.: 12/773,195

(22) Filed: May 4, 2010

(65) Prior Publication Data

US 2010/0285812 A1 Nov. 11, 2010

(30) Foreign Application Priority Data

May 11, 2009 (JP) ................................ 2009-114134

(51) Int. Cl.
*H04Q 7/20* (2006.01)
(52) U.S. Cl. .................. 455/452.1; 370/330; 370/395.2
(58) Field of Classification Search ............... 455/452.1; 370/331, 395.2
See application file for complete search history.

(56) References Cited

U.S. PATENT DOCUMENTS

| 6,473,411 | B1 * | 10/2002 | Kumaki et al. | 370/331 |
| 2002/0191562 | A1 * | 12/2002 | Kumaki et al. | 370/331 |
| 2004/0158644 | A1 * | 8/2004 | Albuquerque et al. | 709/238 |
| 2007/0054668 | A1 * | 3/2007 | Scheinert et al. | 455/435.1 |
| 2007/0183427 | A1 * | 8/2007 | Nylander et al. | 370/395.2 |
| 2010/0027469 | A1 * | 2/2010 | Gurajala et al. | 370/328 |

FOREIGN PATENT DOCUMENTS

| JP | 7-131462 A | 5/1995 |
| JP | 10-13416 A | 1/1998 |
| JP | 10-108260 A | 4/1998 |
| JP | 2003-244741 A | 8/2003 |
| JP | 2004-48580 A | 2/2004 |
| JP | 2004-328157 A | 11/2004 |
| JP | 2007-159053 A | 6/2007 |
| JP | 2007-159055 A | 6/2007 |
| JP | 2008-278263 A | 11/2008 |
| JP | 2009-539303 A | 11/2009 |
| JP | 2009-284396 A | 12/2009 |
| WO | 2005/011319 A1 | 2/2005 |

OTHER PUBLICATIONS

Guidelines regarding Application and Related Aspects of Radio Law, Telecommunications Business Law and Related Laws or Regulations Pertaining to Utilization of Femtocell Base Stations, The Ministry of Internal Affairs and Communications, Dec. 2, 2008, 22 pp., Japan.
Local and Metropolitan Area Networks, IEEE STD 802. 11e, 2005, 4 pp.

* cited by examiner

*Primary Examiner* — Charles Shedrick
(74) *Attorney, Agent, or Firm* — Mattingly & Malur, PC (57) ABSTRACT

A call admission priority control determination device is intended for determining, when a terminal is present in a femtocell and the terminal is to be admitted for call connection, whether it is to be connected to the femtocell or to a macro-cell. The number of remaining connections and a remaining rate in the femtocell if a new call is admitted are figured out. For a specified terminal so registered as to be given priority in connection to the femtocell, the call is admitted if the number of remaining connections and the remaining rate are equal to or greater than 0, but for other terminals than the specified ones in the pertinent femtocell, the call is not admitted if the number of remaining connections and the remaining rate are below certain thresholds.

2 Claims, 9 Drawing Sheets

CALL ADMISSION STATUS TABLE 42

| FEMTOCELL ID NUMBER | CONNECTED TERMINAL ID NUMBER | REQUIRED QUALITY LEVEL | AVERAGE RATE | PEAK RATE |
|---|---|---|---|---|
| 421 | 422 | 423 | 424 | 425 |
| XXXX | CCCCDDDD | VoIP (HIGH PRIORITY) | aaa | ccc |
|  | JJJKKKK | VIDEO (MEDIUM PRIORITY) | bbb | ddd |
| YYYY | ...... | Web (LOW PRIORITY) | — | — |
| ...... | ...... | ...... | ...... | ...... |

CALL ADMISSION PRIORITY CONTROL DETERMINATION DEVICE AND MOBILE WIRELESS COMMUNICATION SYSTEM

CLAIM OF PRIORITY

The present application claims priority from Japanese patent application serial no. 2009-114134, filed on May 11, 2009, the content of which is hereby incorporated by reference into this application.

BACKGROUND OF THE INVENTION

The present invention relates to a call admission priority control determination device and a mobile wireless communication system, and more particularly to a call admission priority control determination device and a mobile wireless communication system using femtocell base stations.

For mobile telephone business operators offering mobile telephone service, it was difficult to set up and operate base stations in such locations as inside of high-rise buildings and residences or underground shopping areas. As a consequence, the elimination of insensitive areas made no satisfactory progress. However, prospects for the elimination of insensitive areas have been improved by the application of femtocell base stations which are simple to handle and can be connected to broadband lines among others.

According to "Guidelines regarding the Application and Related Aspects of the Radio Law, the Telecommunications Business Law and Related Laws or Regulations Pertaining to the Utilization of Femtocell Base Stations" (in Japanese), Dec. 2, 2008, URL: http://www.soumu.go.jp/s-news/2008/pdf/081202_7_bs2.pdf issued by the Ministry of Internal Affairs and Communications, a mobile telephone business operator licensed for femtocell base stations may allow femtocell base station administrators to perform administration of the femtocell base stations by simple handling for transferring, and restoring by utilizing the system of exceptions to the administration of radio stations. The femtocell base station administrators in this context are residents of housing, managers of commercial stores and the like.

JP-A No. 2008-278263 discloses a method of determining a priority cell in communication according to the state of use of wireless resources in each cell, the accommodated traffic volume, the total number of users of cells in the area and the number or ratio of users transmitting on a real time basis. JP-A No. 2008-278263 describes priority between a home cell and a macro-cell; for instance, if the home cell is paid for in a fixed-sum plan which is less costly, the home cell is given priority. According to JP-A No. 2008-278263, each home cell is supposed to be accessible only by a specific user. In this case, this method does not contribute to the easing of macro-cell congestion for any other terminal than that of the specific user. Further, according to JP-A No. 2008-278263, if there is no prescription regarding the priority among plural specific users, the user of a specific terminal such as a home base station operator may therefore suffer deterioration in communication quality due to influences from other users.

Further, IEEE 802.11e prescribes Traffic SPECification (TSPEC) as means of controlling wireless LAN admission. According to this specification, a wireless terminal inquires of the wireless LAN base station at the time of initiating a call whether or not the radio band can be used. The wireless LAN base station judges on the basis of communication already admitted whether or not the new call initiation can be admitted, and communicates the judgment to the wireless terminal. In making this judgment, no priority among users is prescribed, and even the wireless LAN base station may suffer deterioration in communication quality due to influences from other users.

Regarding call admission with a priority level set for a specific user or users, JP-A No. H10-013416 discloses a method by which there is an admission algorithm for each quality class and admission is determined on the basis of comparison of the relative levels between the presumable loss rate and a prescribed value. JP-A No. H07-131462 discloses a method by which call admission is determined by using actual traffic in addition to predeclared traffic parameters.

The setup of femtocell base stations aims, among others, to eliminate insensitive areas of macro-cells in such locations as gaps between buildings, high-rise buildings and underground shopping areas. When insensitive areas of mobile phones are to be eliminated by utilizing a femtocell base station which does not enclose radio waves in a single premises or building, if the femtocell base station is installed within a residence, persons other than the dwellers of that residence can use the femtocell base station. Further, femtocells are also utilized for eliminating the congestion of macro-cells.

In the case described above, when a specified terminal user such as a femtocell base station administrator is engaged in communication within the cell of the base station under its administration, other users may also perform communication within that cell. When more than one terminal is present in the same cell and these terminals communicate with one base station, the wireless resources of that base station are shared among the plural terminals. As a result, the communication rate becomes lower than when communication is performed by only one terminal. Thus, there is a problem that the use of the femtocell base station by other users deteriorates the quality of communication by specified terminal users such as the femtocell base station administrator.

SUMMARY OF THE INVENTION

The present invention provides a call admission priority control determination device and a mobile wireless communication system intended to solve the problem noted above.

The problem noted above can be solved by a call admission priority control determination device including a registration table containing base station ID numbers of base stations and an ID number of a high-priority first terminal, and a call admission determination unit that determines call admission with reference to the registration table, wherein, when a connection request or a switching-over request for a third terminal has been received from a base station control device, the call admission determination unit, on the basis of this request, references the registration table and determines whether or not call admission for the third terminal is to be permitted.

Also, the problem noted above can be solved by a mobile wireless communication system including a macro-cell base station control device and a femtocell base station control device connected to a network, plural macro-cell base stations connected to the macro-cell base station control device, and plural femtocell base stations and a call admission priority control determination device connected to the femtocell base station control device, wherein the call admission priority control determination device includes a registration table containing base station ID numbers of the femtocell base stations, the maximum number of simultaneous connections of the femtocell base stations, a call admission threshold of a low-priority second terminal and an ID number of a high-priority first terminal; a status table containing the base station ID numbers of the femtocell base stations and ID numbers of currently connected terminals; and a call admission determination unit that references the registration table and the status table and determines call admission; and wherein, when a connection request or a switching-over request for a third terminal has been received from the femtocell base station control device, the call admission determination unit, on the basis of this request, references the registration table and determines the priority level of the third terminal, and then determines whether or not call admission for the third terminal is to be permitted on the basis of this priority level, the registration table and the status table.

The invention provides a call admission priority control determination device and a mobile wireless communication system that are advantageous for a femtocell base station administrator.

BRIEF DESCRIPTION OF THE DRAWINGS

A preferred embodiment of the present invention will now be described in conjunction with the accompanying drawings, in which.

DETAILED DESCRIPTION

An exemplary embodiment of the present invention will be described below with reference to the accompanying drawings, wherein substantially the same locations are denoted by respectively the same reference numerals without repetition of the same description.

Figure 1:
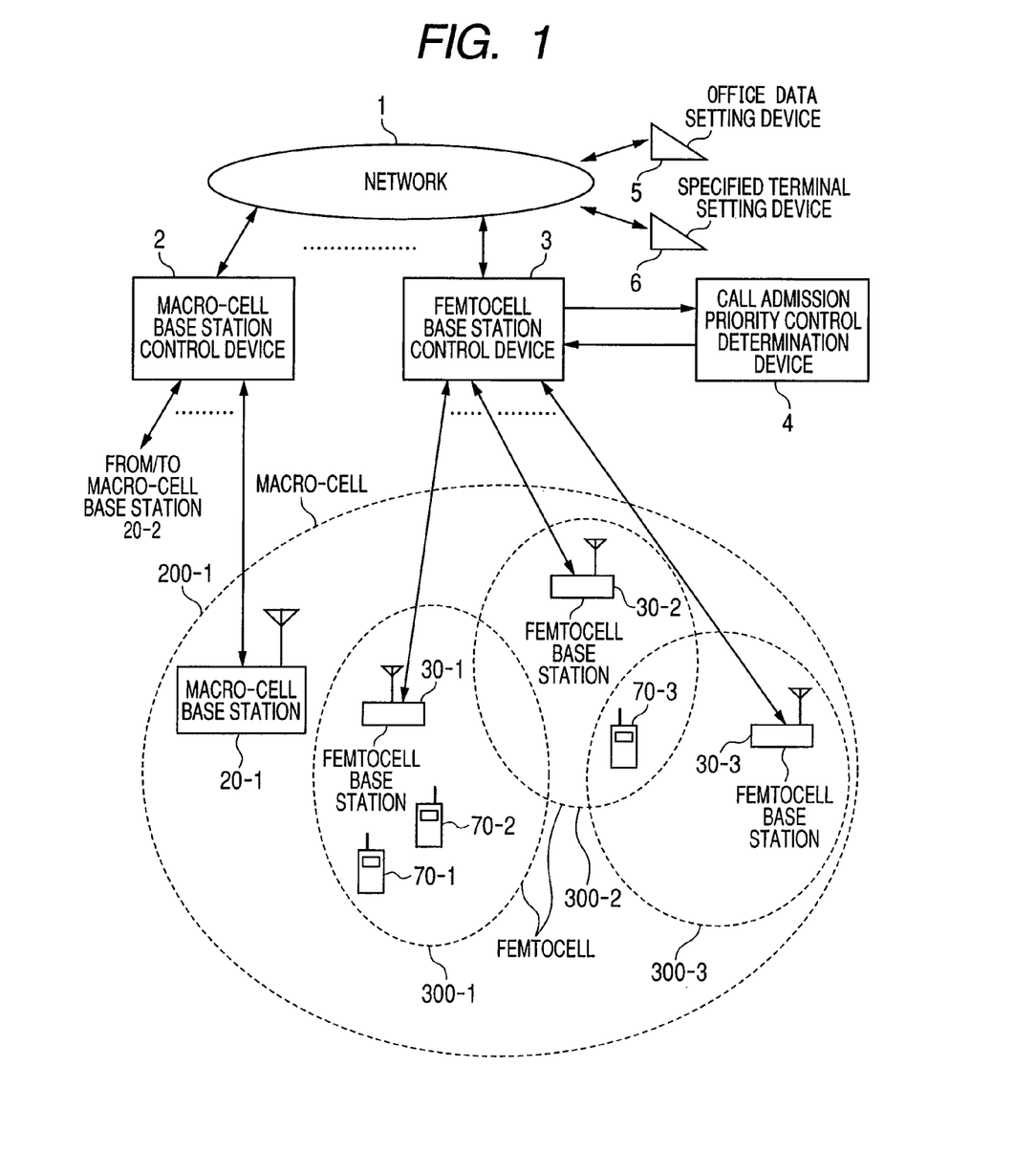
FIG. 1 is a block diagram of a mobile wireless communication system.

The configuration of a mobile wireless communication system will be described with reference to FIG. 1. Referring to FIG. 1, a macro-cell base station control device 2, a femtocell base station control device 3, an office data setting device 5 and a specified terminal setting device 6 are connected to a network 1. Plural macro-cell base stations 20 (20-1 and 20-2) are connected to the macro-cell base station control device 2. Plural femtocell base stations 30 (30-1, 30-2 and 30-3) and a call admission priority control determination device 4 are connected to the femtocell base station control device 3.

A macro-cell base station 20-1 forms a macro-cell 200-1, which is an area where wireless communication is possible. Similarly, a femtocell base station 30 forms a femtocell 300 (300-1, 300-2 and 300-3), which is an area where wireless communication is possible.

The macro-cell 200 (200-1) measures a few kilometers in radius, while the femtocell 300 is much smaller, having a radius of only a few dozens of meters. Incidentally, where femtocells are installed in homes and the femtocells are adjacent to each other, the femtocells may partly overlap one another. FIG. 1 shows a case in which femtocells 300-1 and 300-2 on one hand and femtocells 300-2 and 300-3 on the other overlap each other.

The call admission priority control determination device 4 determines, when a terminal 70 (70-1, 70-2 and 70-3) is present in a femtocell 300 and a call is to be connected to that terminal 70, whether it is to be connected to a femtocell 300 or to the macro-cell 200. The call admission priority control determination device 4 also determines to which femtocell 300 the call is to be connected.

The office data setting device 5 registers the identification (ID) numbers of macro-cell base stations 20 and femtocell base stations 30 and the locational information on the base stations with the macro-cell base station control device 2 and the femtocell base station control device 3 to which the stations respectively belong. The office data setting device 5 also registers with the macro-cell base station control device 2 the ID numbers of the macro-cell base stations 20 under its control. The office data setting device 5 further registers with the macro-cell base station control device 2 information on the macro-cell base station adjacent to the macro-cell base station 20 under its control to work a handoff function.

The office data setting device 5 similarly registers with the femtocell base station control device 3 the ID numbers of the femtocell base stations 30 under its control and the femtocell base stations adjacent thereto. The office data setting device 5 further registers with the macro-cell base station control device 2 the ID numbers of femtocell base stations 30 present in the macro-cell under its control. The office data setting device 5 also registers with the femtocell base station control device 3 the ID number of the macro-cell base station 20 that contains the femtocells 300 under its control. These registrations by the office data setting device 5 make possible switching-over of terminals between macro-cell base stations 20 and femtocell base stations 30.

The specified terminal setting device 6 sets specified terminals 70A in the call admission priority control determination device 4. A specified terminal 70A in this context is, if a femtocell base station 30 is installed in a residence for instance, the terminal of users whose communication with the femtocell base station 30 is given priority, such as the occupants of the residence. Therefore, information on the specified terminal 70A is registered with the specified terminal setting device 6, for example, at the time of setting up a femtocell base station 30. In some femtocell base stations 30, the number of simultaneous connections of terminals may be smaller than with a macro-cell base station 20. For this reason, the specified terminal setting device 6 registers for each femtocell base station 30 the maximum number of simultaneous connections. Similarly, the specified terminal setting device 6 also registers the maximum wireless rate. Further, in order to restrict call admission by terminals 70B other than specified terminals, the specified terminal setting device 6 sets call admission thresholds for the number of connections and data rate. Incidentally, in this specification, the expression "network 1" covers a backbone device (not shown).

Figure 2:
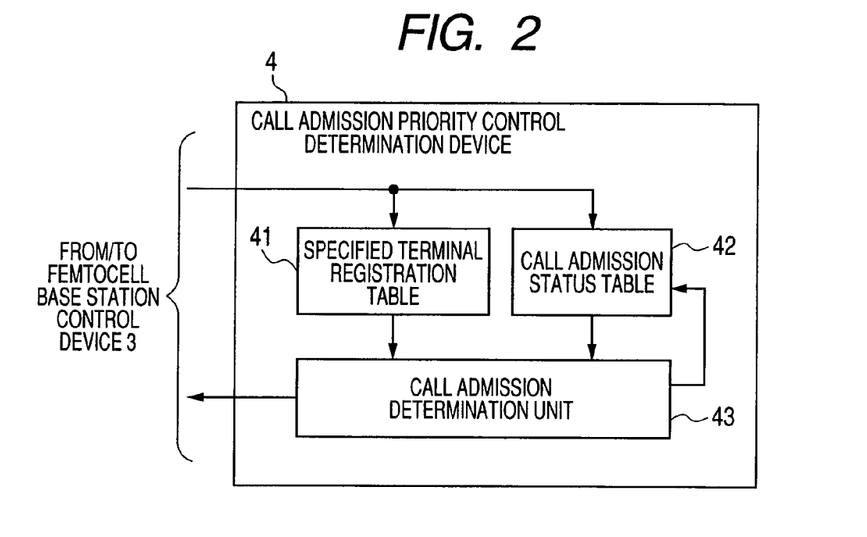
FIG. 2 is a block diagram of a call admission priority control determination device.

The configuration of the call admission priority control determination device will now be described with reference to FIG. 2. Referring to FIG. 2, the call admission priority control determination device 4 includes a specified terminal registration table 41, a call admission status table 42 and a call admission determination unit 43. When a call is to be initiated from the terminal, the call admission priority control determination device 4 receives, to determine whether or not the call is admissible, from the femtocell base station control device 3 the femtocell ID number of the object of admission and the terminal ID number of the object. In response, the call admission determination unit 43 reads out of the specified terminal registration table 41 information on the femtocell admission criteria of the object of possible admission and information as to whether or not the terminal to be admitted or not is a specified terminal. The call admission determination unit 43 further reads out of the call admission status table 42 information on the call admission status of the femtocell to be admitted at the pertinent point of time. The call admission determination unit 43 makes call admission determination on the basis of these items of information. The call admission determination unit 43 provides a reply on the result of determining admission or non-admission to the femtocell base station control device 3. Further, the call admission determination unit 43, if the call is admissible, updates the call admission status table 42 by addition. Or if the call is cut off, the call admission status table 42 is updated by deletion in accordance with an instruction from the femtocell base station control device 3.

Referring to FIG. 2, the specified terminal registration table 41 and the call admission status table 42 are kept in a memory (not shown). The call admission determination unit 43 can be realized by having a central processing unit (CPU) (not shown) execute a program on the memory.

Figure 3:
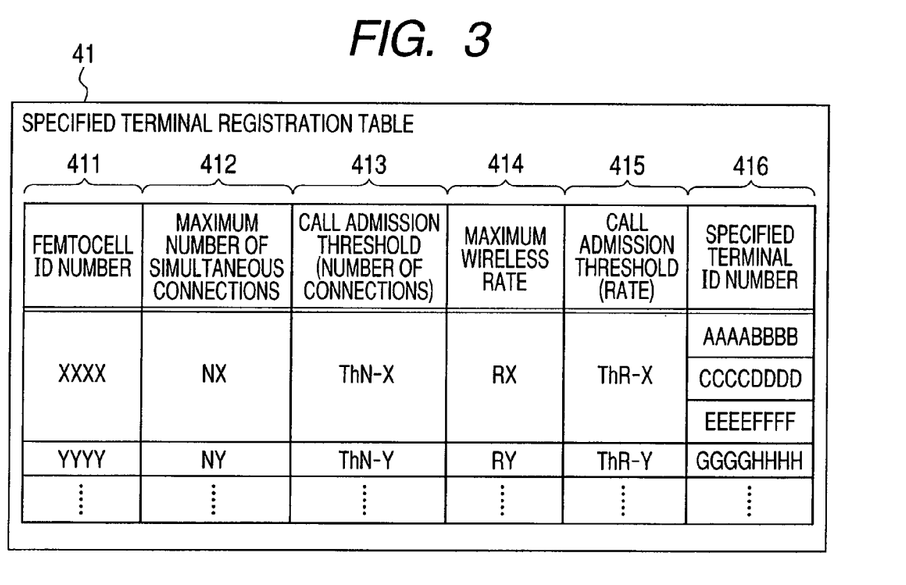
FIG. 3 illustrates a specified terminal registration table.

The specified terminal registration table will be described below with reference to FIG. 3. Referring to FIG. 3, in the specified terminal registration table 41, items set by the specified terminal setting device 6 including femtocell ID numbers 411, maximum numbers of simultaneous connections (N) 412, call admission thresholds (numbers of connections: ThN) 413, maximum wireless rates (R) 414, call admission thresholds (rates: ThR) 415 and specified terminal ID numbers 416 are registered.

The maximum number of simultaneous connections 412 and the maximum wireless rate 414 may vary from one femtocell base station 30 to another. For this reason, the maximum number of simultaneous connections 412 and the maximum wireless rate 414 matching each of the femtocell base stations 30 are registered in the specified terminal registration table 41. The call admission threshold (number of connections) 413 is the threshold of the number of connections admitted to or from terminals other than specified terminals. Similarly, the call admission threshold (rate) 415 is the threshold of the data rate of connections admitted to or from terminals other than specified terminals.

The configuration here is such that the maximum number of simultaneous connections 412, the call admission threshold (number of connections) 413, the maximum wireless rate 414 and the call admission threshold (rate) 415 are registered for each femtocell ID number 411. However, if these values are the same for every femtocell ID number 411, there is no particular need to specify the configuration.

Figure 4:
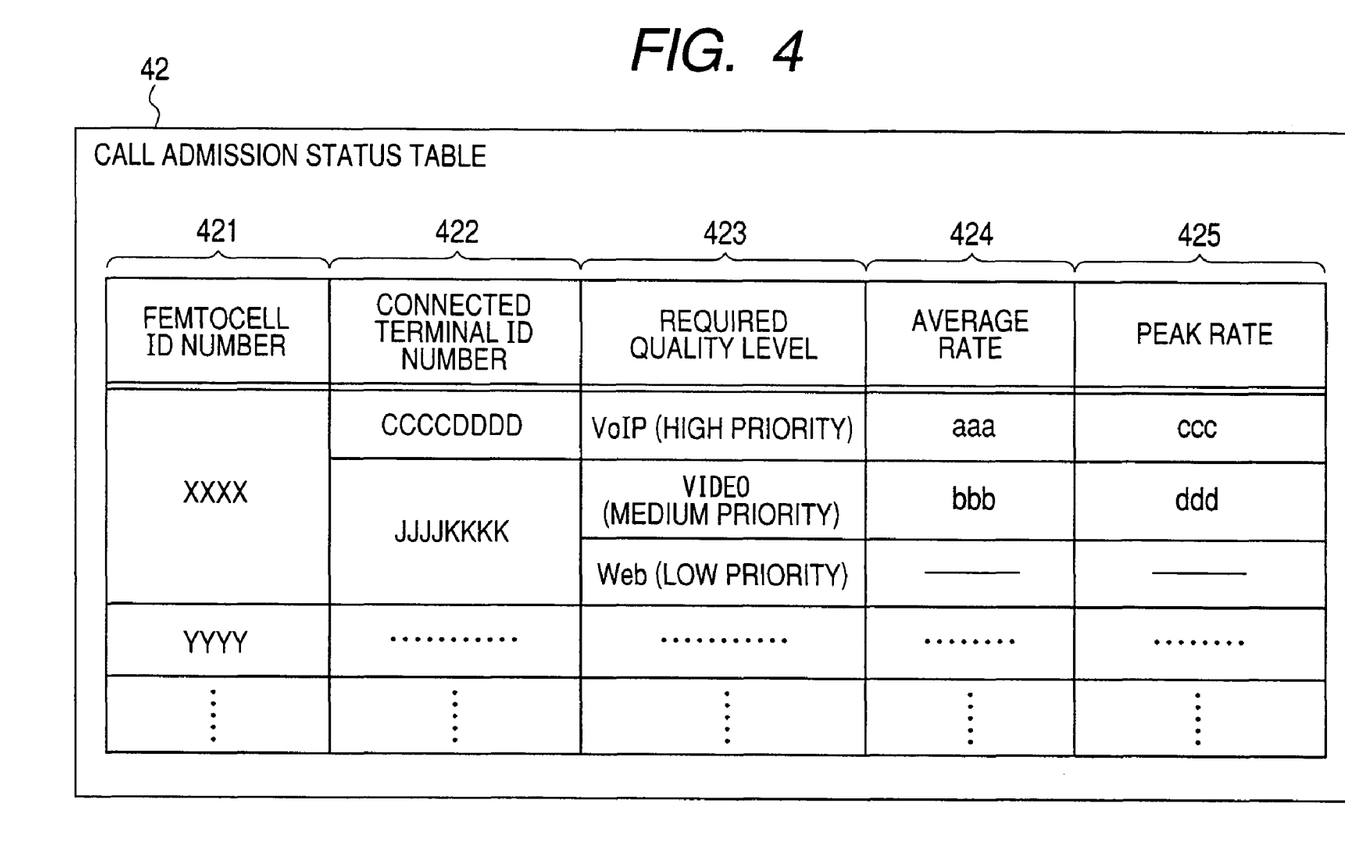
FIG. 4 illustrates a call admission status table.

The registered specified terminal ID number 416 represents terminals 70A each of which treats one or another of the femtocell base stations 30 in a specific way. Here, by registering the terminal of the occupant of the residence in which a femtocell base station is to be installed, the registered terminal is given priority over others in call admission. In a system wherein the call admission criteria are altered according to the quality level, plural call admission thresholds (numbers of connections) 413 and plural call admission thresholds (rates) 415 may be set. If the criteria permit high-priority calls only when an unoccupied band can be sufficiently secured, the call admission thresholds for high priority are set low and the call admission thresholds for low priority are set high. Though not shown in FIG. 3, there is also a method by which an order of priority such as shown in FIG. 4 is prescribed, and a call admission threshold (number of connections or rate) is provided for each level of priority. This method makes possible such a manner of control that when a call of high priority is to be admitted, more unused rates should be secured than for a call of low priority.

The call admission status table will be described with reference to FIG. 4. Referring to FIG. 4, the call admission status table 42 is a table in which the terminal of the call admitted by each femtocell base station at the pertinent point of time is registered. The call admission status table 42 is updated not only by addition when a call is admitted but also when a call is cut off or shifted to another base station by handoff or otherwise. The call admission status table 42 registers femtocell ID numbers 421, connected terminal ID numbers 422, required quality levels 423, average rates 424 and peak rates 425 among others. The call admission status table 42 records, for each femtocell, connected terminals and the quality levels required by the terminals, and further records with respect to each the average rate and the peak rate declared at the time of call connection. The required quality level 423 may be registered in the order of priority such as "high priority", "medium priority" and "low priority", according to the type of application such as "VoIP" (Voice over IP), "video" and "Web". The items such as the required quality level 423, the average rate 424 and the peak rate 425 are registered according to declaration by the terminal 70 or the network 1 at the time of call admission. In a system wherein these items are not declared, no control is exercised over these items in the call admission status table 42 and determination may be made only according to the number of connections even at the time of call admission.

Figure 5:
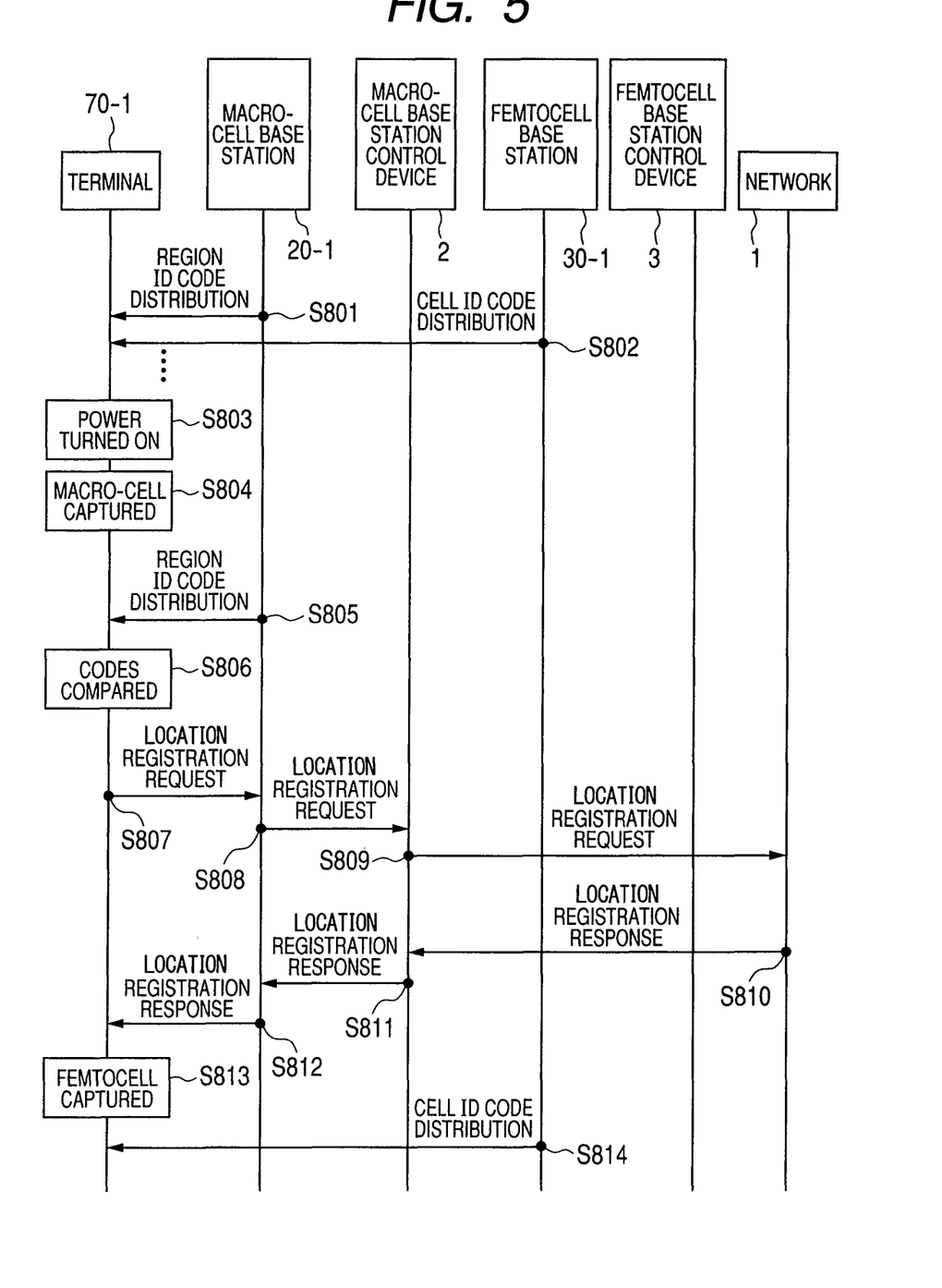
FIG. 5 is a sequence chart illustrating the location registration of a terminal among the terminal, a macro-cell base station, a macro-cell base station control device and a network.

Processing of location registration performed before call initiation by a terminal will be described with reference to FIG. 5. Referring to FIG. 5, the macro-cell base station 20-1 periodically distributes region ID codes (S801). In this region ID code distribution, information on the macro-cell base station 20-1 is transmitted to terminals 70 under its control. Similarly, a femtocell base station 30-1 distributes cell ID codes (S802).

The terminal 70-1 enters into a reception status when power supply is turned on (S803), receives a radio wave from the macro-cell base station 20-1 and captures a macro-cell (S804). After completing the capture, the terminal 70-1 receives distribution of a region ID code from the macro-cell base station 20-1 (S805). The terminal 70-1 reads out the region ID code in the message. The terminal 70-1, which stores the region ID code at the time of power supply actuation, compares the stored code with the code just received (S806). If these codes are found to be the same, there is no need for location registration.

However, it is supposed here that the codes are different, namely the terminal has moved from the region where its location was registered previously. The terminal 70-1 transmits a location registration request to the macro-cell base station 20-1 to register the location (S807). The macro-cell base station 20-1 transmits a location registration request to the macro-cell base station control device 2 (S808). These location registration requests contain the ID number of the terminal 70-1. The macro-cell base station control device 2 transmits the location registration request containing the ID number to the network 1 to request authentication of the terminal 70-1 and the user profile of the terminal 70-1 (S809). A Home Location Register (HLR) (not shown) is connected to the network 1. The HLR, which is a registration device, executes authentication of terminals. The network 1 transmits the location registration response containing the read-out user profile information to the macro-cell base station control device 2 (S810). The macro-cell base station control device 2, having a registering function known as a Visitor Location Register (VLR), registers the user profile. Incidentally, the HLR stores the VLR in which the terminal referred to in an inquiry is registered. As will be described afterwards with reference to FIG. 7, this function is intended for identifying the base station control device whose paging is to be requested when a terminal is to be called up.

The macro-cell base station control device 2 transmits to the macro-cell base station 20-1 the information that location registration has been completed (S811). The macro-cell base station 20-1 transmits the received location registration response to the terminal 70-1 (S812). On such an occasion, the macro-cell base station control device 2 may allocate a temporary identifier to the terminal 70-1. The terminal after the registration of its location may perform subsequent user identification with this temporary identifier. Incidentally, as the temporary identifier, the CDMA 1xEV-DO system uses a Unicast Access Terminal Identifier (UATI).

After that, the terminal 70-1 receives a radio wave from the femtocell base station 30-1 and captures the femtocell (S813). The terminal 70-1 receives distribution of cell ID codes of the femtocell base station 30-1 (S814). As a result, the terminal 70-1 recognizes what identifiers the respective femtocell base stations 30 present in its reception range have.

Figure 6:
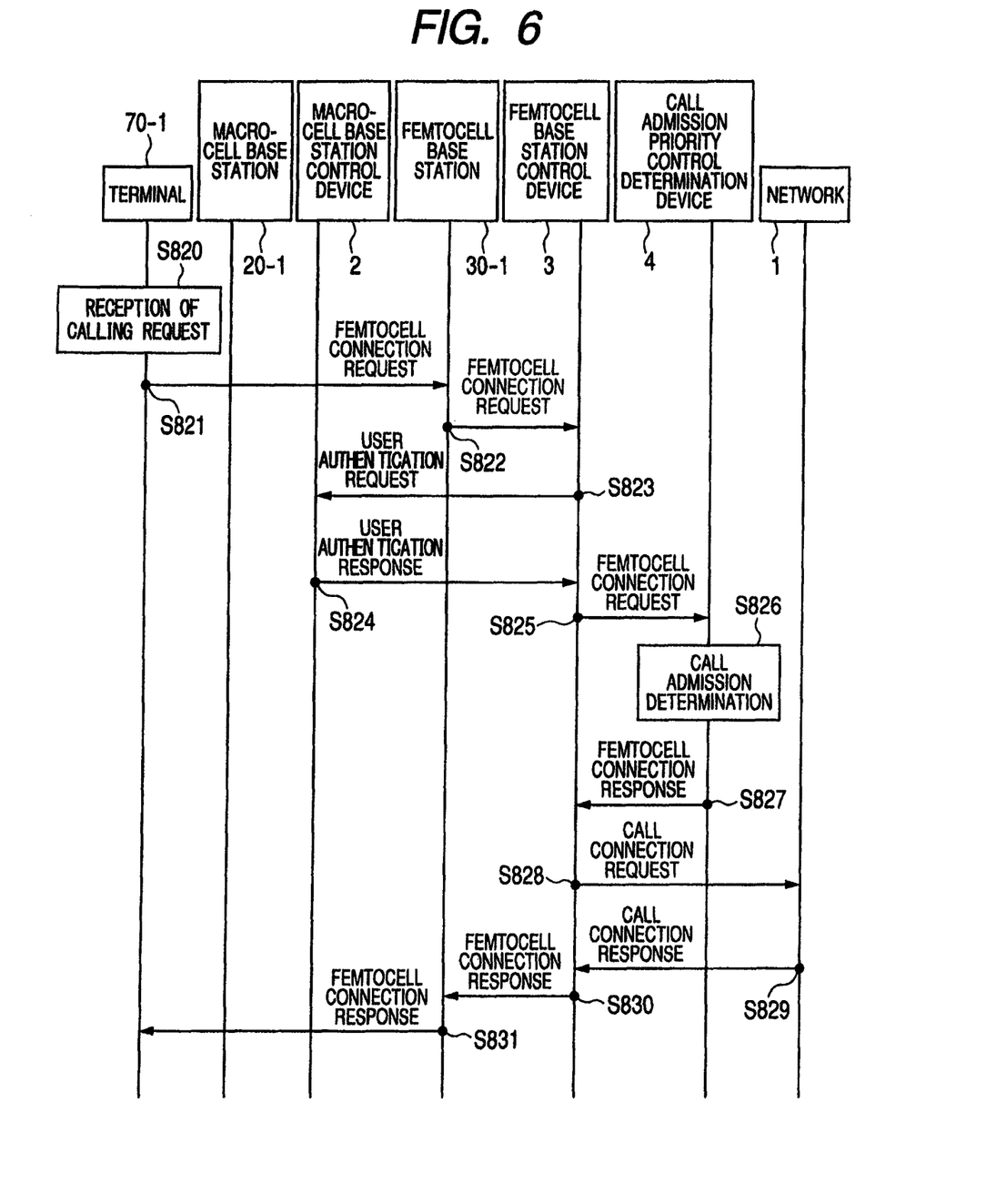
FIG. 6 is a sequence chart illustrating call initiation from a terminal among the terminal, the macro-cell base station control device, a femtocell base station, a femtocell base station control device, a call admission priority control determination device and the network.

Processing of transmission by terminals will be described with reference to FIG. 6. Referring to FIG. 6, the terminal 70-1 has recognized at step 814 of FIG. 5 the presence of the femtocell base station 30-1 nearby. For this reason, the terminal 70-1, when it has received a call request (S820), transmits a femtocell connection request to the femtocell base station 30-1 (S821). The femtocell base station 30-1 transmits the femtocell connection request to the femtocell base station control device 3 (S822). If the terminal 70-1 is to use as the identifier the temporary identifier obtained from the location registration response shown in FIG. 5, that identifier is contained in the femtocell connection request (S821), and the femtocell base station control device 3 transmits a user authentication request to the macro-cell base station control device 2 with which that temporary identifier is registered (S823). The femtocell base station control device 3 is set by the office data setting device 5 with respect to information on the macro-cell containing the femtocell. For this reason, the femtocell base station control device 3 can uniquely determine the macro-cell base station control device 2 to which the user authentication request is to be transmitted.

The macro-cell base station control device 2 derives the terminal ID number from the temporary identifier transferred by the user authentication request, confirms that the temporary identifier is the same as what underwent location registration by the terminal 70-1, and responds to the femtocell base station control device 3 with a user authentication response containing that terminal ID number (S824). The femtocell base station control device 3, to determine connection of the terminal 70-1, transmits a femtocell connection request containing the femtocell ID number of the femtocell base station 30-1 to the call admission priority control determination device 4 (S825). The call admission priority control determination device 4 determines whether or not to admit the call from that terminal (S826). The call admission priority control determination device 4 here indicates a case in which it is determined that the call is to be admitted. After the determination, the call admission priority control determination device 4 transmits a femtocell connection response (S827). The femtocell connection response here is permission to the femtocell base station control device 3 for connection. In order to establish call connection between the terminal 70-1 and the network 1, the femtocell base station control device 3 transmits a call connection request to the network 1 (S828). The network 1 transmits a call connection response to the femtocell base station control device 3 (S829). The femtocell base station control device 3 transmits the femtocell connection response to the femtocell base station 30-1 (S830). The femtocell base station 30-1 transmits the femtocell connection response to the terminal 70-1 (S831). By this process, a call is established between the terminal 70-1 and the network 1.

Figure 7:
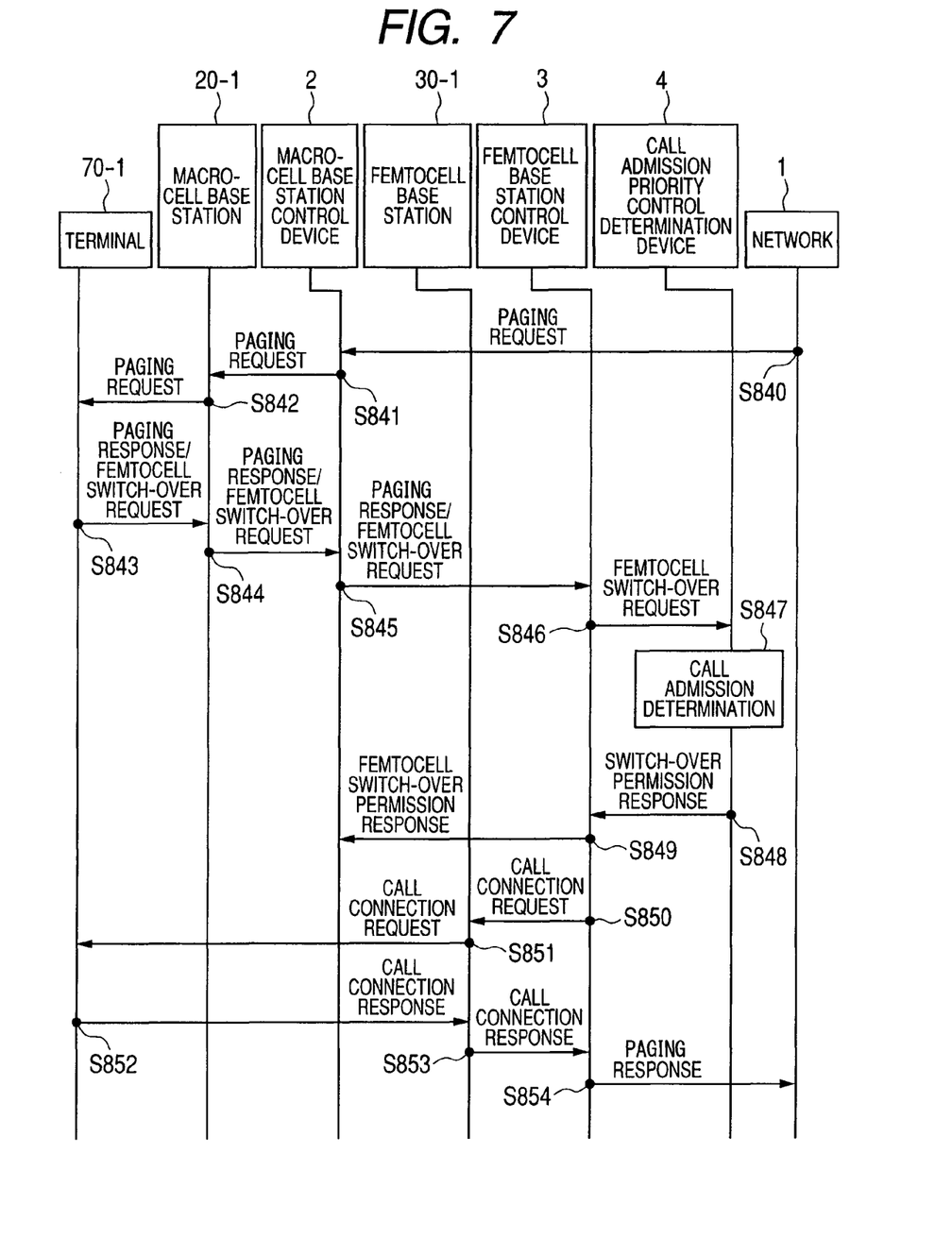
FIG. 7 is a sequence chart illustrating call arrival at a terminal among the terminal, the macro-cell base station, the macro-cell base station control device, the femtocell base station, the femtocell base station control device, the call admission priority control determination device and the network.

The method of determination by the call admission priority control determination device 4 will be described afterwards with reference to FIG. 8. Processing of call arrival at a terminal will now be described with reference to FIG. 7. Referring to FIG. 7, the network 1 stores the macro-cell base station 20-1 in which the called-up terminal 70-1 is located. For this reason, the network 1 transmits a paging request to the macro-cell base station control device 2 (S840). The macro-cell base station control device 2 transmits the paging request to plural macro-cell base stations 20 under its control (S841). The macro-cell base station 20-1 transmits the paging request having the terminal 70-1 (S842). Since the terminal 70-1 here is located under the control of the macro-cell base station 20-1, the paging request is received by the terminal 70-1.

The terminal 70-1 is made aware of its presence under the control of the femtocell base station 30-1 by the cell ID code distribution referred to in FIG. 5. Therefore, the terminal 70-1 transmits a paging response/femtocell switch-over request to the macro-cell base station 20-1 so that a call is connected via the femtocell base station 30-1 (S843). The macro-cell base station 20-1 transmits the paging response/femtocell switch-over request to the macro-cell base station control device 2 (S844).

The macro-cell base station control device 2 derives the terminal ID number from the temporary identifier transferred by the user authentication request, and transmits the paging response/femtocell switch-over request containing the terminal ID number of the terminal 70-1 to the femtocell base station control device 3 (S845). The femtocell base station control device 3 transmits the femtocell switch-over request containing the femtocell ID number of the femtocell base station 30-1 to the call admission priority control determination device 4 (S846).

The call admission priority control determination device 4 determines whether or not the call is to be admitted by the femtocell base station 30-1 (S847). In the case cited here, the call admission priority control determination device 4 is supposed to have determined that the call is to be admitted. The call admission priority control determination device 4 carries out control so that the femtocell base station 30-1, instead of the macro-cell base station 20-1 having made the paging request, is connected to the terminal 70-1. First, the call admission priority control determination device 4 gives a response to the femtocell base station control device 3 for permission of the requested switch-over to the femtocell (S848). The femtocell base station control device 3 transmits the response to the macro-cell base station control device 2 for permission of the switch-over to the femtocell (S849). By these steps, the call admission priority control determination device 4 communicates to the macro-cell base station control device 2 call admission by the terminal 70-1 in the femtocell base station 30-1.

The femtocell base station control device 3 transmits a call connection request to the femtocell base station 30-1 (S850). In accordance with this request, the femtocell base station 30-1 transmits the call connection request to the terminal 70-1 (S851). The terminal 70-1 transmits a call connection response to the femtocell base station 30-1 (S852). The femtocell base station 30-1 transmits the call connection response to the femtocell base station control device 3 (S853). Further, the femtocell base station control device 3 transmits a paging response to the network 1 (S854).

By these steps, the call is established between the network 1 and the terminal 70-1.

The flow of processing by the call admission determination unit will now be described with reference to FIG. 8. Referring to FIG. 8, the call admission determination unit 43, when it has admitted a new call, adds 1 to the number of calls connected to the pertinent femtocell (S431). The call admission determination unit 43 also calculates the total of average rates of calls when it has admitted a new call (S432). Next, the call admission determination unit 43 matches the pertinent femtocell and the call which is the object of determination with the specified terminal registration table 41 to determine whether or not the object of determination is a specified terminal (S433). Also, the call admission determination unit 43 reads out of the specified terminal registration table 41 in advance the maximum number of simultaneous connections and the maximum wireless rate matching the object femtocell.

If the object of determination is found to be a specified terminal at step 433, the call admission determination unit 43 figures out the difference between the maximum number of simultaneous connections and the number of connections after admission of the new call, and determines whether or not the difference, namely the number of remaining connections, is equal to or greater than 0 (S434). If it is less than 0 (No), connection is impossible, and therefore the call admission determination unit 43 determines the call to be inadmissible (S439) and ends the processing. If it is found to be a specified terminal and the count is equal to or greater than 0 at step 434, the call admission determination unit 43 calculates the difference between the maximum wireless rate and the total of average rates after admission of the new call, and determines whether or not the remaining wireless rate is equal to or greater than 0 (S435). If it is equal to or greater than 0, the call admission determination unit 43 judges the call to be admissible (S436) and ends the processing. If it is less than 0 at step 435, the call admission determination unit 43 shifts to step 439.

If the object of determination is not found to be a specified terminal at step 433, the call admission determination unit 43 determines whether or not the number of remaining connections after admission of a new call is equal to or greater than the threshold ThN (S437). If it is below the threshold ThN, the call admission determination unit 43 shifts to step 439. The threshold ThN here is the call admission threshold (number of connections) 413 registered in the specified terminal registration table 41.

If the number is found to be equal to or greater than the threshold ThN at step 437, the call admission determination unit 43 calculates the difference between the maximum wireless rate and the total of average rates after admission of the new call, and determines whether or not the remaining wireless rate is equal to or greater than ThR (S438). If it is found to be equal to or greater than the threshold ThR, the call admission determination unit 43 shifts to step 436. The threshold ThR here is the call admission threshold (rate) 415 registered in the specified terminal registration table 41. If the number is below the threshold ThR at step 438, the call admission determination unit 43 shifts to step 439.

When the number of remaining connections when a new call is to be admitted is smaller than ThN and equal to or greater than 0 or when a new call to be admitted is smaller than ThN and equal to or greater than 0, the call is admitted for a specified terminal but not for any other terminal; namely the specified terminal is given priority in call admission. Incidentally, if the terminal at step 433 is a specified one, the call admission determination unit 43 may dispense with other determinations and shift to step 436.

Figure 8:
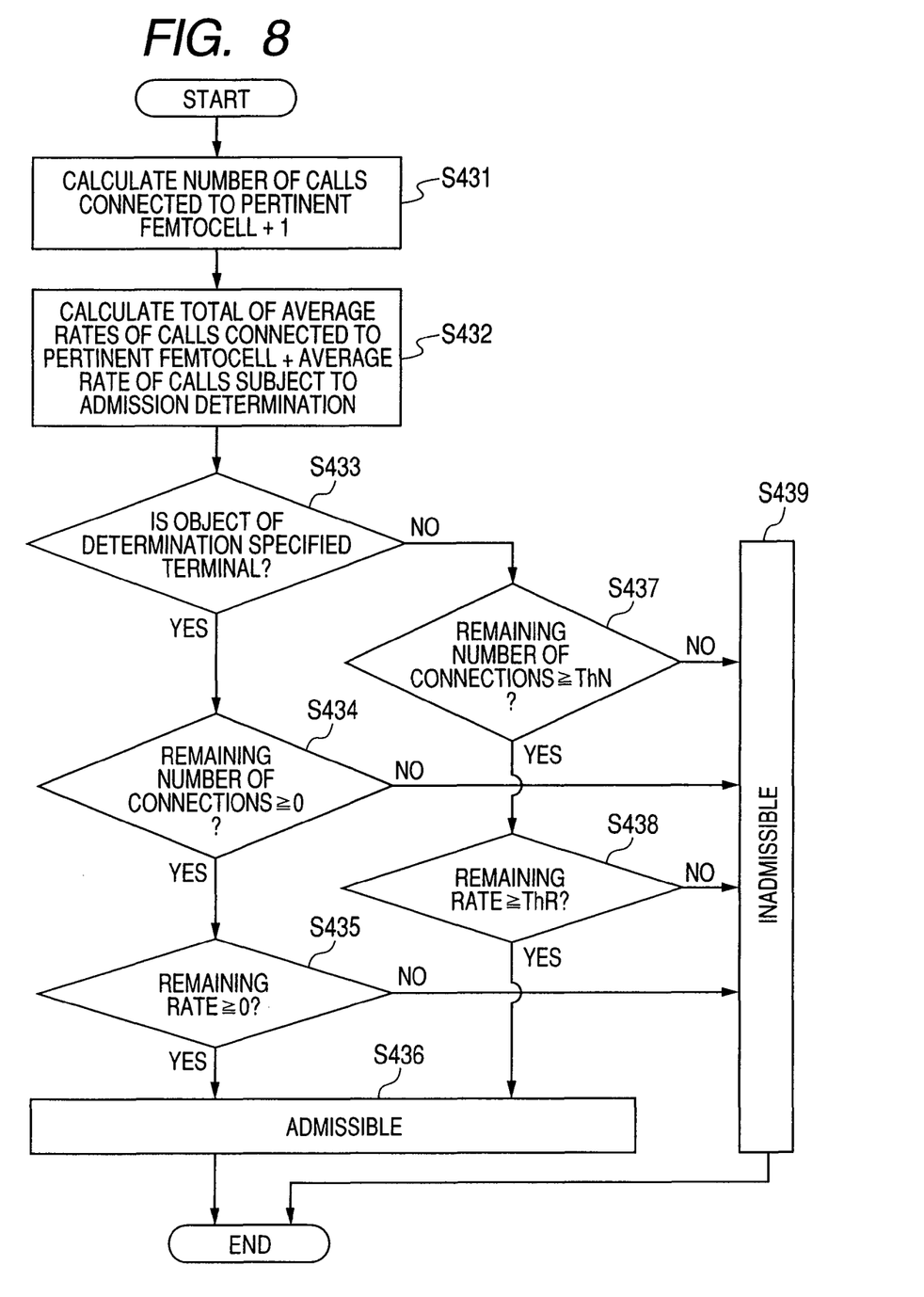
FIG. 8 is a flow chart of a call admission determination unit.

In the flow chart in FIG. 8, determination is made only according to the predeclared average rate and peak rate irrespective of the required quality level 423. There is another method by which thresholds ThN and ThR are set separately for the required quality level and the admission criterion for high-priority calls is set stricter than that for low-priority calls. Further, other methods of determination are disclosed in JP-A No. H10-013416 and JP-A No. H07-131462.

While control of call admissions is described with reference to the above exemplary embodiment, priority control can also be applied to specified terminals for the allocation of wireless resources. More specifically, a band is secured in advance for specified terminals, and the band is prohibited from use by any unspecified terminal. In 1xEV-DO in cdma2000, signals from the base station side to the terminal side undergo time division multiplexing. Therefore, as a way to secure wireless resources for specified terminals, it is possible to allocate a certain time slot for specified terminals in advance to prioritize wireless resources.

Meanwhile, in wireless LAN and the like, call admission control is carried out at the access point. In such a case, by providing the functions of a call admission priority control determination device at the access point, prioritization of specified terminals can be realized.

Figure 9:
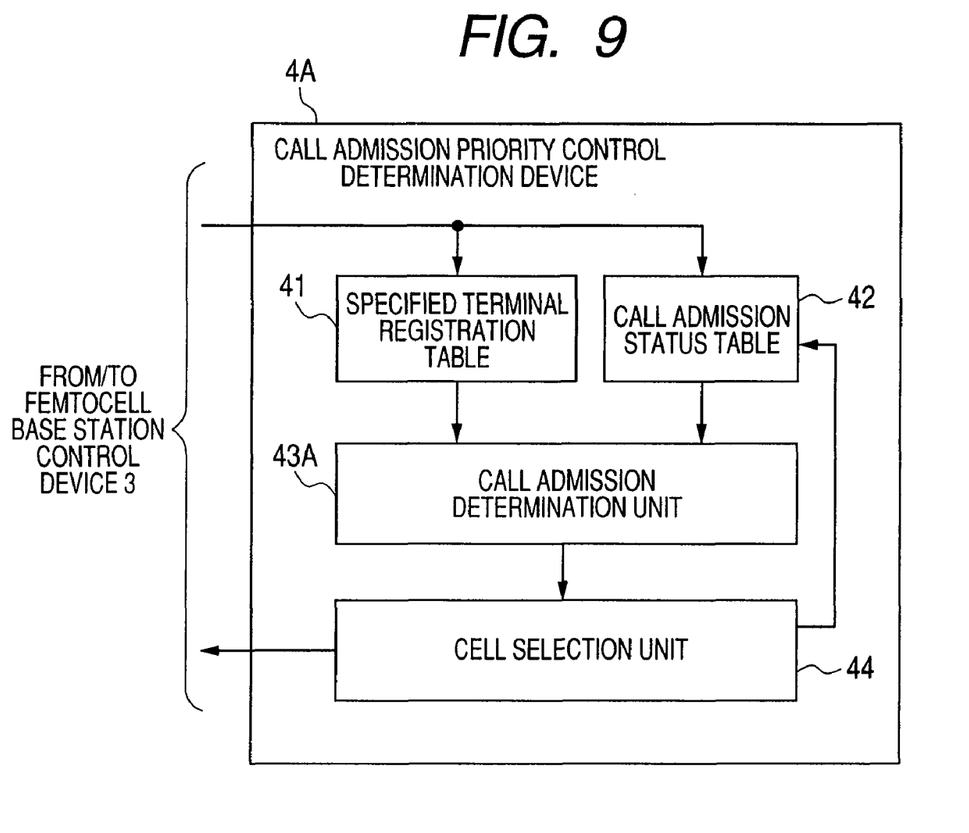
FIG. 9 is another block diagram of a call admission priority control determination device.

Another call admission priority control determination device suitable for use where call admission takes place in an area in which plural femtocells overlap each other will now be described with reference to FIG. 9. This call admission priority control determination device 4A is intended for application to terminals present in an area where the femtocells 300-2 and 300-3 overlap each other like the case of the terminal 70-3 illustrated in FIG. 1. Referring to FIG. 9, the call admission priority control determination device 4A includes the specified terminal registration table 41, the call admission status table 42, a call admission determination unit 43A and a cell selection unit 44.

The terminal 70-3 present in an area in which plural femtocells overlap each other transfers the ID numbers of connectable femtocell base stations to the call admission priority control determination device 4A via the femtocell base station control device 3. The call admission priority control determination device 4A reads information on each of the plural femtocells which are candidates for connection out of the specified terminal registration table 41 and the call admission status table 42, and transfers it to the call admission determination unit 43A. As described with regard to the call admission determination unit 43, this unit determines whether or not a call is admissible for each femtocell. The call admission determination unit 43A transfers to the cell selection unit 44 the result of admissibility determination for each femtocell and the remaining rate of each. The cell selection unit 44 selects a femtocell to be connected out of the plural connection candidate femtocells, and transmits a femtocell connection response to the femtocell base station control device 3. Further, when a call is to be admitted, the cell selection unit 44 updates the call admission status table 42 by addition. If the call is cut off, the call admission status table 42 is updated by deletion in accordance with an instruction from the femtocell base station control device 3.

Referring to FIG. 9, the specified terminal registration table 41 and the call admission status table 42 are kept in a memory (not shown). The call admission determination unit 43A can be realized by having a central processing unit (CPU) (not shown) execute a program on the memory.

Figure 10:
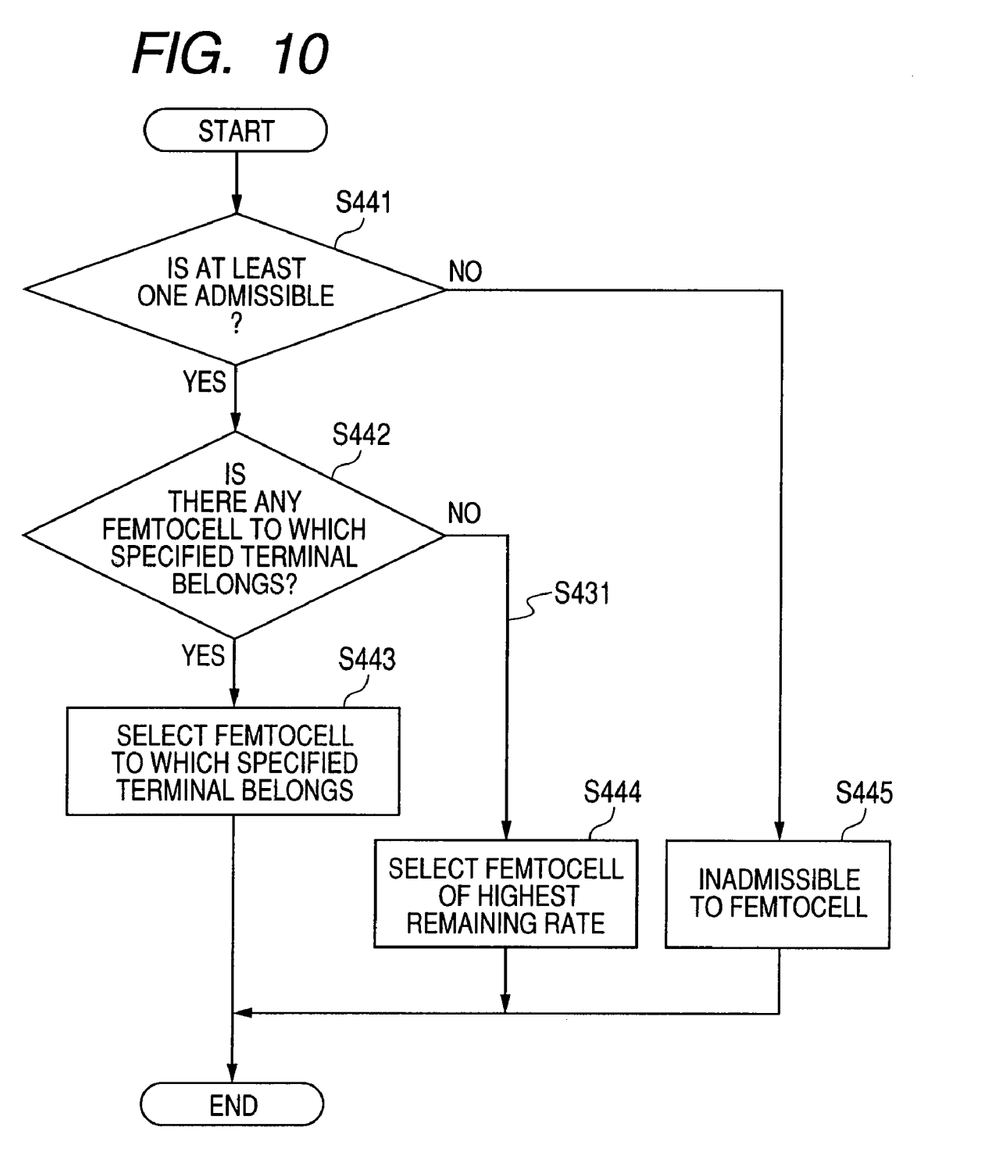
FIG. 10 is a flow chart of a cell selection unit.

Processing by the cell selection unit will now be described with reference to FIG. 10. Referring to FIG. 10, the cell selection unit 44 determines whether or not there is at least one femtocell determined as permitting admission by the call admission determination unit 43A (S441). If the reply is "Yes", the cell selection unit 44 determines whether or not any of the femtocells is one to which the object terminal belongs as a specified terminal (S442). If the reply is "Yes", the cell selection unit 44 selects that femtocell, causes the terminal to be connected to that femtocell (S443), and ends the processing. If the reply is "No" at step 442, the cell selection unit 44 selects, from among the femtocells, a femtocell with the highest remaining rate (S444), and ends the processing. Regarding a femtocell to which a call is to be admitted, the cell selection unit 44 updates the call admission status table 42 by addition.

If there is found no femtocell permitting admission (No) at step 441, the cell selection unit 44 determines inadmissibility and transmits a response to that effect to the femtocell base station control device 3 (S445).

The exemplary embodiment of the invention described above makes possible elimination of macro-cell congestion for unspecified users by installing femtocell base stations. Further, it can provide advantages to specified terminal users including femtocell base station administrators in the use of femtocell base stations and in the quality of communication.

What is claimed is:

1. A call admission priority control determination device comprising:
   a registration table containing base station ID numbers of base stations and an ID number of a high-priority first terminal, and
   a call admission determination unit that determines call admission with reference to the registration table,
   wherein, when a connection request or a switching-over request for a third terminal has been received from a base station control device, the call admission determination unit, on the basis of this request, references the registration table and determines whether or not call admission for the third terminal is to be permitted,
   wherein the registration table further has the maximum numbers of simultaneous connections of the base stations and call admission thresholds of a low-priority second terminal,
   the call admission priority control determination device further having a status table including the base station ID numbers of the base stations and ID numbers of currently connected terminals, and
   wherein, when a connection request or a switching-over request for a third terminal has been received from a base station control device, the call admission determination unit, on the basis of this request, references the registration table and determines a priority level of the third terminal, and then determines whether or not call admission for the third terminal is to be permitted on the basis of this priority level, the registration table and the status table.

2. A mobile wireless communication system comprising a macro-cell base station control device and a femtocell base station control device connected to a network, a plurality of macro-cell base stations connected to the macro-cell base station control device, and a plurality of femtocell base stations and a call admission priority control determination device connected to the femtocell base station control device,
   wherein the call admission priority control determination device includes a registration table containing base station ID numbers of the femtocell base stations, the maximum number of simultaneous connections of the femtocell base stations, a call admission threshold of a low-priority second terminal and an ID number of a high-priority first terminal; a status table containing the base station ID numbers of the femtocell base stations and ID numbers of currently connected terminals; and a call admission determination unit that references the registration table and the status table and determines call admission; and
   wherein, when a connection request or a switching-over request for a third terminal has been received from the femtocell base station control device, the call admission determination unit, on the basis of this request, references the registration table and determines a priority level of the third terminal, and then determines whether or not call admission for the third terminal is to be permitted on the basis of this priority level, the registration table and the status table.

* * * * *